(12) United States Patent
Lanza et al.

(10) Patent No.: US 7,735,101 B2
(45) Date of Patent: Jun. 8, 2010

(54) SYSTEM ALLOWING USERS TO EMBED COMMENTS AT SPECIFIC POINTS IN TIME INTO MEDIA PRESENTATION

(75) Inventors: Michael Lanza, San Francisco, CA (US); Naicu Octavian, Dambovita (RO); Michael Rutchik, Belvedere, CA (US)

(73) Assignee: Cisco Technology, Inc., San Jose, CA (US)

( * ) Notice: Subject to any disclaimer, the term of this patent is extended or adjusted under 35 U.S.C. 154(b) by 29 days.

(21) Appl. No.: 11/691,936

(22) Filed: Mar. 27, 2007

(65) Prior Publication Data

US 2007/0245243 A1    Oct. 18, 2007

Related U.S. Application Data

(60) Provisional application No. 60/787,055, filed on Mar. 28, 2006.

(51) Int. Cl.
*H04N 7/085* (2006.01)
(52) U.S. Cl. .......................... 725/32; 709/246
(58) Field of Classification Search .............. 725/32, 725/135; 709/205, 246; 715/512; 345/473, 345/776; 463/29; 434/322
See application file for complete search history.

(56) References Cited

U.S. PATENT DOCUMENTS

| | | | |
|---|---|---|---|
| 3,810,156 A | 5/1974 | Goldman | |
| 3,919,479 A | 11/1975 | Moon et al. | |
| RE29,051 E | 11/1976 | Jones | |
| 4,023,456 A | 5/1977 | Groeschel | |
| 4,217,588 A | 8/1980 | Freeny, Jr. | |
| 4,305,131 A | 12/1981 | Best | |
| 4,450,531 A | 5/1984 | Kenyon et al. | |
| 4,476,469 A | 10/1984 | Lander | |
| 4,481,382 A | 11/1984 | Villa-Real | |
| 4,528,589 A | 7/1985 | Block et al. | |
| 4,605,964 A | 8/1986 | Chard | |
| 4,605,973 A | 8/1986 | Von Kohorn | |
| 4,697,209 A | 9/1987 | Kiewit et al. | |

(Continued)

FOREIGN PATENT DOCUMENTS

CN    101491089 A    7/2009

(Continued)

OTHER PUBLICATIONS

PCT Notification of Transmittal of the International Search Report and the Written Opinion of the International Searching Authority, or the Declaration for PCT Application No. PCT/US2007/065392; mailed Jul. 15, 2008; 8 pages.

(Continued)

*Primary Examiner*—Le Luu
(74) *Attorney, Agent, or Firm*—Patent Capital Group

(57) ABSTRACT

A method and system for linking a web page to a portion of a video is provided. Users can enter comments into a video that include a start and end time index for identifying a portion of a video. Comments are indexed to the media presentations such that they may be searched and located, thus media playback can be executed from any comment. The system allocates a unique comment track to each user that can be turned on and off at will by users during playback.

36 Claims, 10 Drawing Sheets

U.S. PATENT DOCUMENTS

| | | |
|---|---|---|
| 4,739,398 A | 4/1988 | Thomas et al. |
| 4,750,213 A | 6/1988 | Novak |
| 4,811,325 A | 3/1989 | Sharples, Jr. et al. |
| 4,881,179 A | 11/1989 | Vincent |
| 4,888,638 A | 12/1989 | Bohn |
| 4,918,730 A | 4/1990 | Schulze |
| 4,931,950 A | 6/1990 | Isle et al. |
| 5,057,932 A | 10/1991 | Lang |
| 5,063,610 A | 11/1991 | Alwadish |
| 5,109,482 A | 4/1992 | Bohrman |
| 5,117,618 A | 6/1992 | Dunlap et al. |
| 5,119,503 A | 6/1992 | Mankovitz |
| 5,119,507 A | 6/1992 | Mankovitz |
| 5,134,719 A | 7/1992 | Mankovitz |
| 5,153,579 A | 10/1992 | Fisch et al. |
| 5,210,820 A | 5/1993 | Kenyon |
| 5,276,909 A | 1/1994 | Milner et al. |
| 5,307,456 A | 4/1994 | MacKay |
| 5,319,455 A | 6/1994 | Hoarty et al. |
| 5,333,176 A | 7/1994 | Burke et al. |
| 5,347,506 A | 9/1994 | Matsudo et al. |
| 5,353,121 A | 10/1994 | Young et al. |
| 5,371,551 A | 12/1994 | Logan et al. |
| 5,406,558 A | 4/1995 | Rovira et al. |
| 5,406,626 A | 4/1995 | Ryan |
| 5,408,686 A | 4/1995 | Mankovitz |
| 5,436,653 A | 7/1995 | Ellis et al. |
| 5,485,219 A | 1/1996 | Woo |
| 5,485,518 A | 1/1996 | Hunter et al. |
| 5,485,611 A | 1/1996 | Astle |
| 5,524,051 A | 6/1996 | Ryan |
| 5,526,284 A | 6/1996 | Mankovitz |
| 5,534,911 A | 7/1996 | Levitan |
| 5,541,638 A | 7/1996 | Story |
| 5,544,231 A | 8/1996 | Cho |
| 5,548,828 A | 8/1996 | Kozaki et al. |
| 5,557,338 A | 9/1996 | Maze et al. |
| 5,557,541 A | 9/1996 | Schulhof et al. |
| 5,559,860 A | 9/1996 | Mizikovsky |
| 5,561,704 A | 10/1996 | Salimando |
| 5,561,849 A | 10/1996 | Mankovitz |
| 5,572,194 A | 11/1996 | Shiota |
| 5,572,442 A | 11/1996 | Schulhof et al. |
| 5,574,999 A | 11/1996 | Gzorren |
| 5,583,937 A | 12/1996 | Ulrich et al. |
| 5,590,195 A | 12/1996 | Ryan |
| 5,592,511 A | 1/1997 | Schoen et al. |
| 5,602,982 A | 2/1997 | Judd et al. |
| 5,610,653 A | 3/1997 | Abecassis |
| 5,623,404 A | 4/1997 | Collins et al. |
| 5,634,849 A | 6/1997 | Abecassis |
| 5,659,877 A | 8/1997 | Enomoto et al. |
| 5,661,787 A | 8/1997 | Pocock |
| 5,668,917 A | 9/1997 | Lewine |
| 5,671,195 A | 9/1997 | Lee |
| 5,675,695 A | 10/1997 | Hirayama et al. |
| 5,686,954 A | 11/1997 | Yoshinobu et al. |
| 5,694,163 A | 12/1997 | Harrison |
| 5,710,815 A | 1/1998 | Ming et al. |
| 5,721,827 A | 2/1998 | Logan et al. |
| 5,732,216 A | 3/1998 | Logan et al. |
| 5,732,324 A | 3/1998 | Rieger, III |
| 5,736,977 A | 4/1998 | Lee |
| 5,751,806 A | 5/1998 | Ryan |
| 5,754,938 A | 5/1998 | Herz et al. |
| 5,781,228 A | 7/1998 | Sposato |
| 5,810,600 A | 9/1998 | Okada |
| 5,812,131 A | 9/1998 | Bertram |
| 5,815,671 A | 9/1998 | Morrison |
| 5,818,439 A | 10/1998 | Nagasaka et al. |
| 5,838,917 A | 11/1998 | Paolini |
| 5,841,979 A | 11/1998 | Schulhof et al. |
| 5,844,620 A | 12/1998 | Coleman et al. |
| 5,872,588 A | 2/1999 | Aras et al. |
| 5,881,377 A | 3/1999 | Giel et al. |
| 5,884,056 A | 3/1999 | Steele |
| 5,892,536 A | 4/1999 | Logan et al. |
| 5,914,941 A | 6/1999 | Janky |
| 5,920,287 A | 7/1999 | Belcher et al. |
| 5,929,848 A | 7/1999 | Albukerk et al. |
| 5,937,331 A | 8/1999 | Kalluri et al. |
| 5,949,876 A | 9/1999 | Ginter et al. |
| 5,956,629 A | 9/1999 | Morrison |
| 5,966,440 A | 10/1999 | Hair |
| 5,970,504 A | 10/1999 | Abe et al. |
| 5,974,218 A | 10/1999 | Nagasaka et al. |
| 5,986,692 A | 11/1999 | Logan et al. |
| 6,005,565 A | 12/1999 | Legall et al. |
| 6,005,603 A | 12/1999 | Flavin |
| 6,006,257 A | 12/1999 | Slezak |
| 6,014,429 A | 1/2000 | LaPorta et al. |
| 6,025,868 A | 2/2000 | Russo |
| 6,026,376 A | 2/2000 | Kenney |
| 6,026,446 A | 2/2000 | Ostrover et al. |
| 6,072,860 A | 6/2000 | Kek et al. |
| 6,081,830 A | 6/2000 | Schindler |
| 6,088,455 A | 7/2000 | Logan et al. |
| 6,088,593 A | 7/2000 | Dent |
| 6,118,450 A | 9/2000 | Proehl et al. |
| 6,122,378 A | 9/2000 | Yoshiura et al. |
| 6,144,375 A | 11/2000 | Jain et al. |
| 6,147,940 A | 11/2000 | Yankowski |
| 6,154,771 A | 11/2000 | Rangan et al. |
| 6,160,989 A | 12/2000 | Hendricks et al. |
| 6,163,596 A | 12/2000 | Gelfer et al. |
| 6,172,677 B1 | 1/2001 | Stautner et al. |
| 6,199,076 B1 | 3/2001 | Logan et al. |
| 6,222,909 B1 | 4/2001 | Qua et al. |
| 6,226,030 B1 | 5/2001 | Harvey et al. |
| 6,233,389 B1 | 5/2001 | Barton et al. |
| 6,243,725 B1 | 6/2001 | Hempleman et al. |
| 6,248,946 B1 | 6/2001 | Dwek |
| 6,259,367 B1 | 7/2001 | Klein |
| 6,262,724 B1 | 7/2001 | Crow et al. |
| 6,289,165 B1 | 9/2001 | Abecassis |
| 6,324,211 B1 | 11/2001 | Ovard et al. |
| 6,357,042 B2 | 3/2002 | Srinivasan et al. |
| 6,366,296 B1 | 4/2002 | Boreczky et al. |
| 6,388,958 B1 | 5/2002 | Yankowski |
| 6,389,467 B1 | 5/2002 | Eyal |
| 6,493,550 B1 | 12/2002 | Raith |
| 6,499,027 B1 | 12/2002 | Weinberger |
| 6,505,160 B1 | 1/2003 | Levy et al. |
| 6,519,693 B1 | 2/2003 | Debey |
| 6,526,411 B1 | 2/2003 | Ward |
| 6,553,178 B2 | 4/2003 | Abecassis |
| 6,560,798 B2 | 5/2003 | Welling et al. |
| 6,563,515 B1 | 5/2003 | Reynolds et al. |
| 6,567,980 B1 | 5/2003 | Jain et al. |
| 6,574,594 B2 | 6/2003 | Pitman et al. |
| 6,581,207 B1 | 6/2003 | Sumita et al. |
| 6,584,463 B2 | 6/2003 | Morita et al. |
| 6,594,484 B1 | 7/2003 | Hitchings, Jr. |
| 6,611,673 B1 | 8/2003 | Bayley et al. |
| 6,628,303 B1 | 9/2003 | Foreman et al. |
| 6,631,271 B1 | 10/2003 | Logan |
| 6,637,029 B1 | 10/2003 | Maissel et al. |
| 6,637,032 B1 | 10/2003 | Feinleib |
| 6,714,797 B1 | 3/2004 | Rautila |
| 6,738,978 B1 | 5/2004 | Hendricks et al. |
| 6,748,195 B1 | 6/2004 | Phillipa |
| 6,754,904 B1 | 6/2004 | Cooper et al. |
| 6,763,345 B1 | 7/2004 | Hempleman et al. |
| 6,788,766 B2 | 9/2004 | Logan |

| | | |
|---|---|---|
| 6,795,017 B1 | 9/2004 | Puranik et al. |
| 6,813,775 B1 | 11/2004 | Finseth et al. |
| 6,816,577 B2 | 11/2004 | Logan |
| 6,839,880 B1 | 1/2005 | Morse et al. |
| 6,868,440 B1 | 3/2005 | Gupta et al. |
| 6,888,811 B2 | 5/2005 | Eaton et al. |
| 6,898,434 B2 | 5/2005 | Pradhan et al. |
| 6,931,451 B1 | 8/2005 | Logan et al. |
| 6,990,676 B1 | 1/2006 | Proehl et al. |
| 6,996,402 B2 | 2/2006 | Logan et al. |
| 7,027,716 B1 | 4/2006 | Boyle et al. |
| 7,055,166 B1 | 5/2006 | Logan et al. |
| 7,058,376 B2 | 6/2006 | Logan et al. |
| 7,313,808 B1 | 12/2007 | Gupta et al. |
| 2001/0016491 A1 | 8/2001 | Imura et al. |
| 2001/0049826 A1 | 12/2001 | Wilf |
| 2002/0026496 A1 | 2/2002 | Boyer et al. |
| 2002/0034980 A1 | 3/2002 | Lemmons et al. |
| 2002/0085689 A1 | 7/2002 | Chin |
| 2002/0100052 A1 | 7/2002 | Daniels |
| 2002/0102974 A1 | 8/2002 | Raith |
| 2002/0106191 A1 | 8/2002 | Betz et al. |
| 2002/0120925 A1 | 8/2002 | Logan |
| 2002/0133499 A1 | 9/2002 | Ward et al. |
| 2002/0157099 A1 | 10/2002 | Schrader et al. |
| 2002/0157101 A1 | 10/2002 | Schrader et al. |
| 2002/0166123 A1 | 11/2002 | Schrader et al. |
| 2002/0181671 A1 | 12/2002 | Logan |
| 2003/0054885 A1 | 3/2003 | Pinto et al. |
| 2003/0088872 A1 | 5/2003 | Maissel et al. |
| 2003/0093790 A1 | 5/2003 | Logan et al. |
| 2003/0095790 A1 | 5/2003 | Joshi |
| 2003/0100965 A1 | 5/2003 | Sitrick et al. |
| 2003/0104782 A1 | 6/2003 | Wong et al. |
| 2003/0110507 A1 | 6/2003 | DiMitrova et al. |
| 2003/0182254 A1 | 9/2003 | Plastine et al. |
| 2003/0208473 A1 | 11/2003 | Lennon |
| 2003/0231868 A1 | 12/2003 | Herley |
| 2004/0017389 A1 | 1/2004 | Pan et al. |
| 2004/0059783 A1* | 3/2004 | Kazui et al. .................. 709/205 |
| 2004/0078808 A1 | 4/2004 | Herledan |
| 2004/0087363 A1* | 5/2004 | Bogenn ........................ 463/29 |
| 2004/0111465 A1 | 6/2004 | Chuang et al. |
| 2004/0117831 A1 | 6/2004 | Ellis et al. |
| 2004/0138948 A1 | 7/2004 | Loomis |
| 2004/0169683 A1* | 9/2004 | Chiu et al. .................. 345/776 |
| 2004/0249726 A1 | 12/2004 | Linehan |
| 2004/0255330 A1 | 12/2004 | Logan |
| 2004/0255334 A1 | 12/2004 | Logan |
| 2004/0255336 A1 | 12/2004 | Logan et al. |
| 2004/0255340 A1 | 12/2004 | Logan |
| 2004/0268386 A1 | 12/2004 | Logan et al. |
| 2005/0005308 A1 | 1/2005 | Logan et al. |
| 2005/0022890 A1 | 2/2005 | Demchick |
| 2005/0044561 A1 | 2/2005 | McDonald |
| 2005/0054290 A1 | 3/2005 | Logan et al. |
| 2005/0076362 A1 | 4/2005 | Dukes et al. |
| 2005/0144641 A1 | 6/2005 | Lewis |
| 2005/0149964 A1 | 7/2005 | Thomas et al. |
| 2005/0183119 A1 | 8/2005 | Hofrichter et al. |
| 2005/0239549 A1 | 10/2005 | Salvatore et al. |
| 2005/0262542 A1 | 11/2005 | DeWeese et al. |
| 2005/0283810 A1 | 12/2005 | Ellis et al. |
| 2006/0015925 A1 | 1/2006 | Logan |
| 2006/0031882 A1 | 2/2006 | Swix et al. |
| 2006/0073462 A1* | 4/2006 | Tetreault ..................... 434/322 |
| 2006/0129458 A1 | 6/2006 | Maggio |
| 2006/0143559 A1* | 6/2006 | Spielberg et al. ........... 715/512 |
| 2006/0164422 A1* | 7/2006 | Wurtzel et al. .............. 345/473 |
| 2006/0174313 A1* | 8/2006 | Ducheneaut et al. ........ 725/135 |
| 2006/0183447 A1 | 8/2006 | Cowley et al. |
| 2006/0184989 A1 | 8/2006 | Slothouber |
| 2006/0190966 A1 | 8/2006 | McKissick et al. |
| 2006/0218579 A1 | 9/2006 | Logan et al. |
| 2006/0280437 A1 | 12/2006 | Logan et al. |
| 2007/0026852 A1 | 2/2007 | Logan et al. |
| 2007/0037605 A1 | 2/2007 | Logan |
| 2007/0037610 A1 | 2/2007 | Logan |
| 2007/0083674 A1* | 4/2007 | Mulder et al. ............... 709/246 |
| 2007/0113250 A1 | 5/2007 | Logan et al. |
| 2007/0300258 A1 | 12/2007 | O'Connor et al. |
| 2008/0005130 A1 | 1/2008 | Logan et al. |
| 2008/0036917 A1 | 2/2008 | Pascarella et al. |
| 2008/0052739 A1 | 2/2008 | Logan |
| 2008/0059989 A1 | 3/2008 | O'Connor et al. |
| 2008/0060001 A1 | 3/2008 | Logan et al. |
| 2008/0092168 A1 | 4/2008 | Logan et al. |
| 2008/0154628 A1 | 6/2008 | Ogawa et al. |
| 2008/0155616 A1 | 6/2008 | Logan et al. |
| 2008/0155627 A1 | 6/2008 | O'Connor et al. |
| 2008/0261564 A1 | 10/2008 | Logan |

FOREIGN PATENT DOCUMENTS

| | | |
|---|---|---|
| EP | 0424648 B1 | 5/1991 |
| EP | 2224712 | 10/1997 |
| EP | 0898278 A2 | 2/1999 |
| EP | 1079623 A1 | 2/2001 |
| EP | 1 999 953 AO | 10/2007 |
| GB | 2304489 A | 3/1997 |
| WO | WO 96/27840 | 9/1996 |
| WO | WO 96/37965 | 11/1996 |
| WO | WO 97/40611 | 10/1997 |
| WO | WO 98/31113 | 7/1998 |
| WO | WO 01/15449 | 3/2001 |
| WO | WO 2004/043029 | 5/2004 |
| WO | WO 2005/022890 | 3/2005 |
| WO | 2007/112448 A2 | 10/2007 |

OTHER PUBLICATIONS

PCT International Preliminary Report on Patentability for PCT Application No. PCT/US2007/065392; mailed Sep. 30, 2008; 4 pages.

* cited by examiner

SYSTEM ALLOWING USERS TO EMBED COMMENTS AT SPECIFIC POINTS IN TIME INTO MEDIA PRESENTATION

CROSS REFERENCE TO RELATED APPLICATIONS

The present invention claims priority to U.S. Provisional Patent Ser. No. 60/787,055, filed Mar. 28, 2006, which is incorporated by reference in its entirety.

TECHNICAL FIELD

The present disclosure relates generally to audiovisual presentations.

BACKGROUND

Multimedia has enjoyed huge popularity with the proliferation of the Internet, the augmentation of the Internet with high-speed communication methods (such as Digital Subscriber line—DSL), and cheap, relatively fast home computers. The everyday user has little trouble surfing the Internet, but when audio and especially video presentations are available to enhance the user's experience, the average user is often frustrated by the implementation of such media presentations and their ability to experience them. Generally, online media presentations are of poor audio and video quality, and they lack any intelligent type of indexing of interesting portions of the presentation or a method for finding and commenting on portions of a presentation.

A known way to provide a media presentation to a user is to provide a hyperlink to the file that can be downloaded and viewed on a generic software playback interface; however, this suffers from severe drawbacks.

First, it is difficult to integrate text with an audio-visual presentation in an effective manner such that the text may be searched and used to index the presentation. A known method for including text in a media presentation is the use of dialog subtitles at the bottom of the screen where the subtitles are a language translation of the audio track, but this provides no way for the user to advance to a portion of a multimedia presentation based on a specific subtitle. Another known method, which is similar to subtitles, is prevalent in the motion picture industry where opening credits and closing credits (aka, the "crawl") are added as text overlays. Once again, these methods do not assist with finding specific points within a presentation. Generally, none of these methods allow the average user to add such text to a presentation.

Second, it is difficult for the user to find a specific moment within a multimedia presentation that they wish to view. A known method for finding a specific moment within a multimedia presentation is the use of a scroll bar that is linked to the multimedia presentation such that the scroll bar "throw" (movement of the scroll bar within a limiting region) relates to the entire length of the multimedia presentation and moving the bar within the "throw" moves the multimedia presentation to a point of time in relation thereto. Unfortunately, the "throw" of a scroll bar is generally limited and fixed such that small movements of the scroll bar can advance a multimedia presentation several minutes, thus finding a specific moment within a multimedia presentation can be very difficult, frustrating, and often impossible.

Another known method for finding a specific moment within a multimedia presentation is the use of "fast-forward" and "rewind" controls. Similar to scroll bars, such controls can lack the fine resolution needed to zero in on a specific moment in a multimedia presentation.

Another known method for finding a specific moment within a multimedia presentation is the use of preset index points such as the scene delineations used on DVDs and track separations on CDs. These types of index points are often too coarse. Some movies are two hours or more in length with only 15 or 20 scene breaks; meaning that each scene could be as much as 10 minutes in length such that a user could waste many minutes waiting for the portion of the scene they wish to view.

Therefore, there is a need for a more effective method of viewing a media presentation that overcomes the disadvantages of conventional methods discussed above.

BRIEF DESCRIPTION OF THE DRAWINGS

Like element numbers in different figures represent the same or similar elements.

DESCRIPTION

Overview

Figure 1:
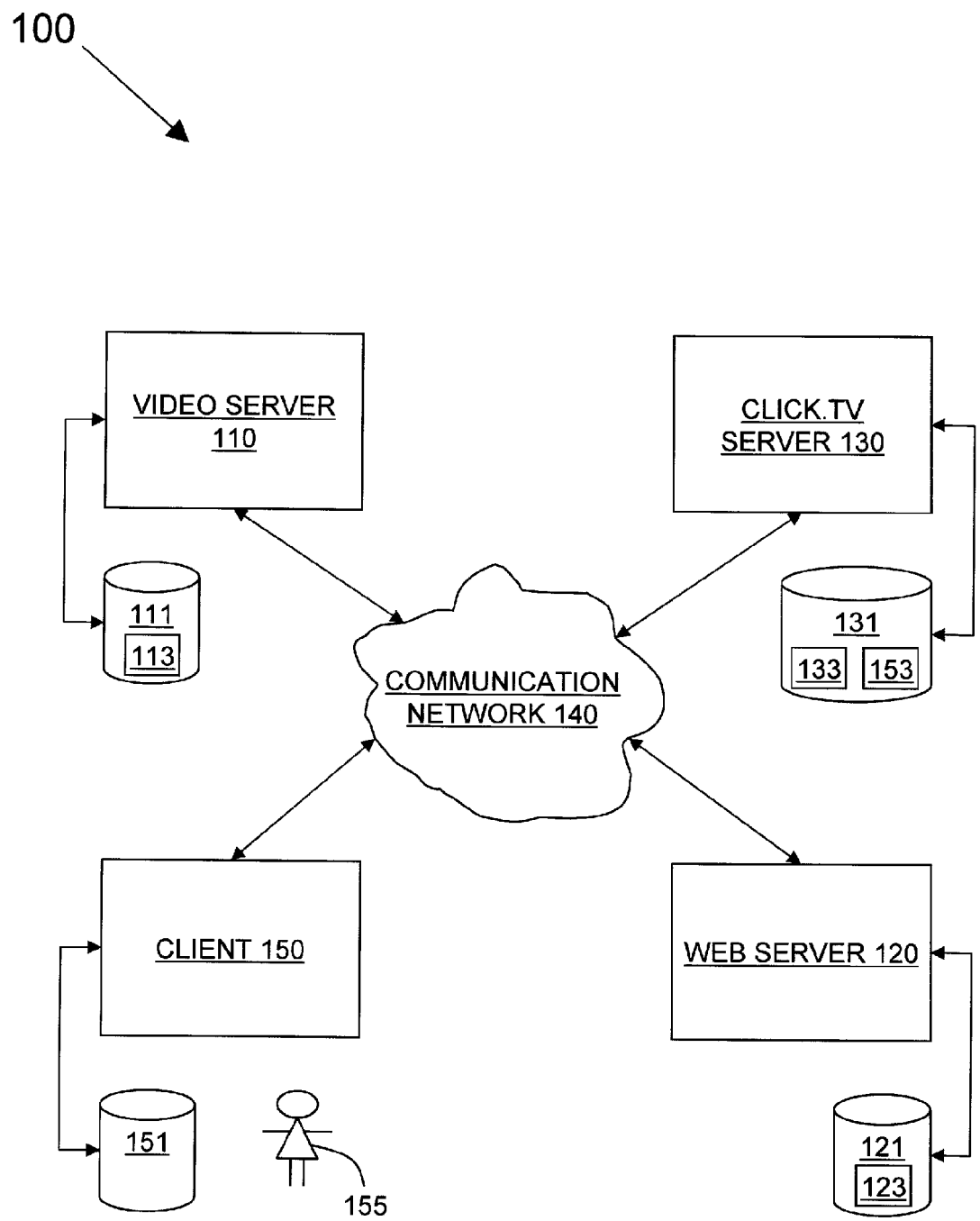
FIG. 1 illustrates a block diagram of a system and method for embedded metadata in a media presentation according to one embodiment.

According to one aspect of the invention, a method of associating text with a video presentation whereby the text can be freely inserted, edited, searched, and can be indexed to the video is provided.

When a user browsing the Internet finds information on a web page, that information can contain a link to a portion of a video presentation. When the user activates the link, code in the web page downloads a media player to the user. The media player processes parameters that are in the code on the web page, which includes the URL of that portion of the media presentation to be played and a set of comments associated with the media presentation. The media player requests the media presentation and presents it to the user. The media player also requests comments associated with the portion of the media presentation which are also presented to the user.

The media player itself includes a video panel, a set of controls, and a scrolling comments panel. Comments are displayed in sync with the video during playback. The user can manually scroll through and select a comment which causes playback of the video at the time slot associated with the comment. Comments can be from any number of users.

A time slot matrix appears when the user passes a mouse pointer or the like over the video panel. The time slot matrix includes names of each commenter, a toggle for turning on and off comments associated with the commenter, and sets of time slots that visually present the relative location of a comment in a media presentation.

To add a comment to a media presentation, a user can click on a control causing a comment window to open where the user can then enter text, graphics, and web links. The user can also edit the point in time and duration of the comment to more accurately reflect when they want their comment to appear and for how long.

To place a partial or whole instance of a media presentation on another web page, a user selects a control button that displays code for linking to the media presentation. The user then copies this code and inserts it into their web page. The user can also search for words or phrases in the comments, such that the user interface will show the comments containing the words or phrases and a slide bar will provide a visual indication of where the comments were made. The user can then click on the comment or the visual indication, which takes the user to the corresponding portion of the media presentation.

A compact version of the media player can be enabled at the option of the user. The compact version is more screen-space friendly, since it does not include the scrolling comments window.

These and other features and advantages will be more readily apparent from the description of example embodiments set forth below taken in conjunction with the accompanying drawings, which are for purposes of illustrating example embodiments only, and not for purposes of limiting the same.

DESCRIPTION OF EXAMPLE EMBODIMENTS

Definitions

The following terms refer to or relate to aspects of the invention as described below. The descriptions of general meanings of these terms are not intended to be limiting, only illustrative as to one or more embodiments.

Blog—Generally a noun, blog is an abbreviation or diminutive for Web log, i.e., a blog is a Web page that serves as a publicly accessible personal journal for an individual. Often updated daily, blogs often reflect the personality of the author. As a verb, "to blog" means to author a web log.

Comment—This can be any text input by a user or text entered by a computer, such as transcript text or identification of scene changes. Comments can also be audio.

User—User can be a human person, an initiated software program, or a device.

Editing—Editing includes identifying segments in a media presentation by at least one start time of the media presentation. Editing can also include identifying segments by at least an end time.

Management—Specific to the present invention, management can be more specifically defined as "segment metadata management", which would include attaching metadata attributes to a segment such as comment text, tag, time entered, time modified, start time, end time, author, IDs of replies, web links, graphic files, or audio files. This includes both the initial assignment of these metadata attributes as well as the editing of them.

Non-linear viewing—Viewing of a media presentation based on manual or automated selection of one or a series of metadata elements.

Media presentation—A video, audio, visual presentation or any combination of thereof, with or without comments.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

FIG. 1 illustrates a block diagram of a system 100 for embedded metadata in a media presentation according to one embodiment. System 100 can include a video server 110, one or more web servers 120, a CLICK.TV[1] server 130, one or more clients 150 associated with one or more users 155, and a communication network 140. Note that CLICK.TV server 130 may be any suitable server performing the functions described herein.

[1]Click.TV™ and CLICK.TV™ are trademarks of CLICK.TV, Inc.

The video server 110 includes a processor, a main memory, a video server storage 111, a set of videos 113, and software for executing instructions (not shown, but understood by one skilled in the art and explained further herein). This software includes software capable of operating the video server 110 consistent with the invention as further explained herein. Typically, the video server 110 operates to store and deliver video on demand. The video server 110 can be any suitable streaming video server (e.g., Flash Media Server from Adobe) or HTTP server.

A video in the set of videos 113 includes a digital media presentation. In one embodiment, the video includes a moving picture as well as an audio presentation. In alternate embodiments, a moving picture can be presented without any accompanying audio or audio can be presented without a moving picture.

Each web server 120 in the set of web servers includes a processor, a main memory, a web server storage 121, a set of web pages 123, and software for executing instructions (not shown, but understood by one skilled in the art and explained further herein). Typically, the web server 120 operates to serve web pages 123 at the demand of the client 150. In other embodiments, the web server 120 is not present, e.g., for implementations with an IPTV or a mobile phone that shows the CLICK.TV player without a surrounding web page, such as a Flash-enabled IPTV set top box or a flash-enabled mobile phone.

The CLICK.TV server 130 includes a processor, a main memory, a vendor server storage 131, a media application 133, and software for executing instructions (not shown, but understood by one skilled in the art and explained further herein). Typically, the CLICK.TV server 130 operates to provide software and other data to the client 150. The software includes functionality to control videos served by the video server and add/edit/remove/search comments to portions of the videos as further described herein.

The media application 133 includes a user interface 200 and a set of tools for working with videos 113 and comments 153 as further explained herein. The media application 133 also can include a video player to provide the nonlinear viewing options as will be described below. The video player can be any suitable type, such as, but not limited to one based on Adobe's Flash technology. The client 150 includes a processor, a main memory, a client storage 151, a set of comments, one or more users 155, and software for executing instructions (not shown, but understood by one skilled in the art and explained further herein). This software includes web browsing software, software provided by the CLICK.TV server 130 (explained further herein) and other software capable of operating the CLICK.TV server 130 consistent with the invention.

A set of communication links couple the video server 110, web server 120, CLICK.TV server 130, and client 150 to the communication network 140. In one embodiment, all the aforementioned elements are present as described. It should be noted that, although the video server storage 111, web server storage 121, CLICK.TV server storage 131, and client storage 151 are illustrated in FIG. 1 as separate devices, there is no requirement that they are separate devices. In an alternative embodiment, these storage devices may be incorporated into the video server 110, web server 120, CLICK.TV server 130, and client 150.

In an alternative embodiment, the video server 110, web server 120, and CLICK.TV server 130 can be combined in some combination. For example, the video server 110 and the web server 120 can be combined such that a video file resides on a combination of the devices.

User Interface for Embedded Content

Figure 2:
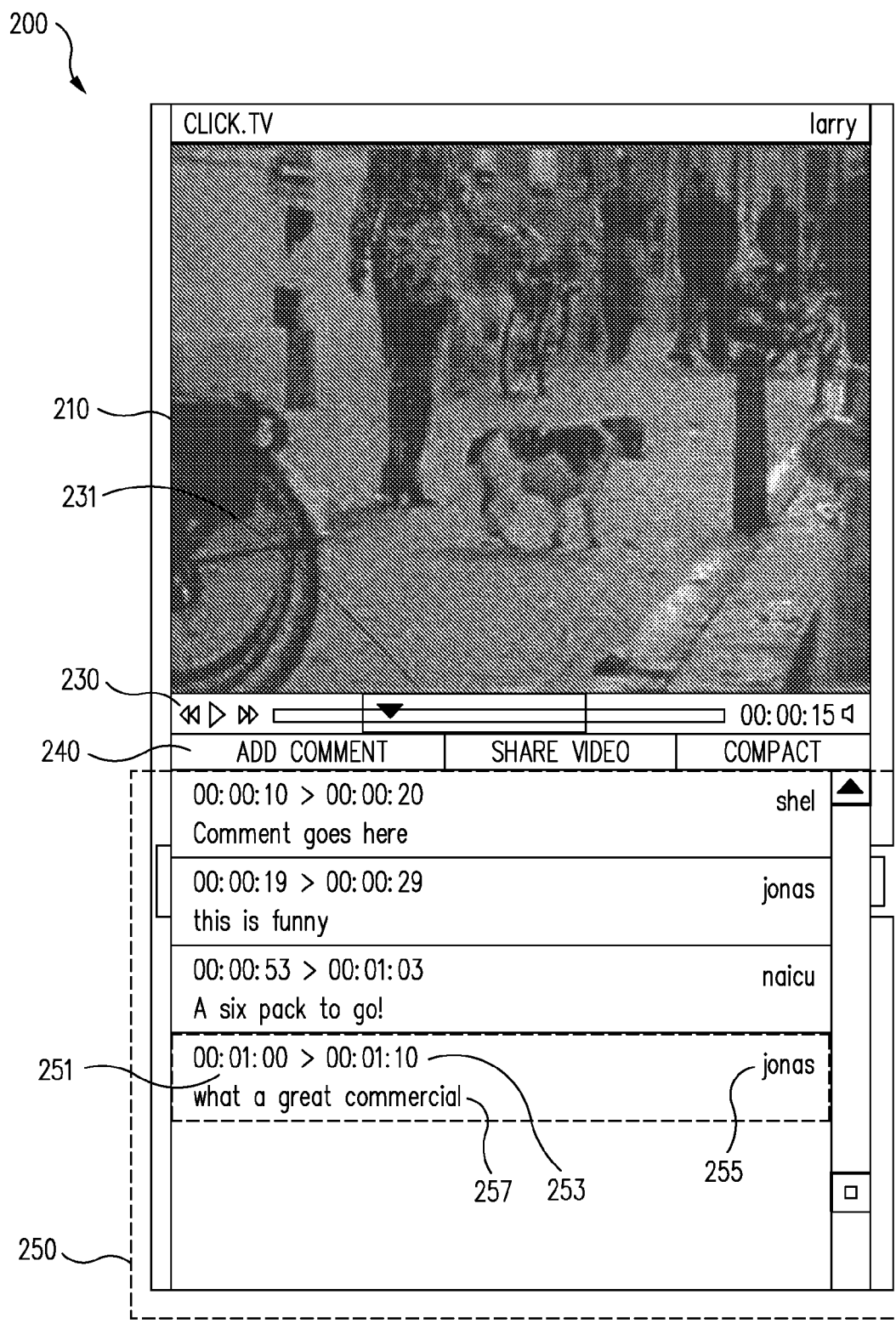
FIG. 2 illustrates a user interface for embedded metadata in a media presentation according to one embodiment.

FIG. 2 illustrates a user interface 200 for embedded metadata in a media presentation according to one embodiment. User interface 200 may be part of the client 150, either integral with or separate from the client, and can be a display on a computer screen, mobile phone, or television. User interface 200 can include a video display panel 210, a set of video controls 230, a set of CLICK.TV controls 240, and a scrolling comment panel 250. The video display panel 210 includes a portion of the user interface 200 primarily used to display the moving picture portion of a video 113.

The set of video controls 230 includes software buttons that can be activated by the user 155 with a mouse pointer (or a similar controlling device) for transport control of the video 113. Generally, the video controls 230 include the software buttons play, pause, step back, and step forward. A video position scroll bar, a time index display, and a sound control are also provided. The step back button allows the user 155 to go to a frame slightly previous (e.g., one or two seconds) to the current frame of a video 113. The play button allows the user 155 to toggle the functions of playing and pausing a video 113. The step forward button allows the user 155 to go to a frame slightly ahead (e.g., one or two seconds) of the current frame of a video 113. The video position scroll bar gives the user 155 a visual, relative indication, of how far they have progressed through the video 113, and the time index display gives an exact time of play for the currently displayed point in the video 113. The sound control provides at least some control of any audio that is included with the video 113, such as volume.

The comments associated with portions of the display are scrolled and display in synch with the video. For example, the comment associated with the current display will be shown, and possibly highlighted, at the top of the scrolling comment panel 250.

The set of CLICK.TV controls 240 includes a set of software buttons that can be activated by the user 155 with a mouse pointer. In one embodiment, these buttons include an "ADD COMMENT" button, a "SHARE VIDEO" button, and a "COMPACT" toggle button.

In another embodiment, the controls 240 include a "+COMMENT" button to add comments, an "EMAIL" button for sending all or a selected portion of the video, along with corresponding comments, to an e-mail recipient, a "BLOG" button for copying and pasting code that displays all or a selected portion of the video, along with corresponding comments, to any web page, and a search window that allows the user to type in a word or phrase and search all the comments associated with the current video for that specific word or phrase. Once the search is completed, the scrolling comment panel 250 may display all comments having the desired word or phrase, and the video scroll bar may have visual indications, such as vertical lines, showing where in the video the comments correspond to. Also, a new track, e.g., a "search track," for that search term is created in a portion of the display for track selection buttons, which will be discussed in detail below. For example, a search may result in five comments containing the desired word or phrase. The video scroll bar would then have five indicators at various locations. The user can then go to a specific portion of the video by either selecting (e.g., clicking) the desired comment, clicking on a specific indicator on the video scroll bar, or clicking on a square or other visual indicator in a matrix overlaying the video, as will be discussed in detail below. Combinations of these and other buttons may also be suitable for the present invention.

Figure 3:
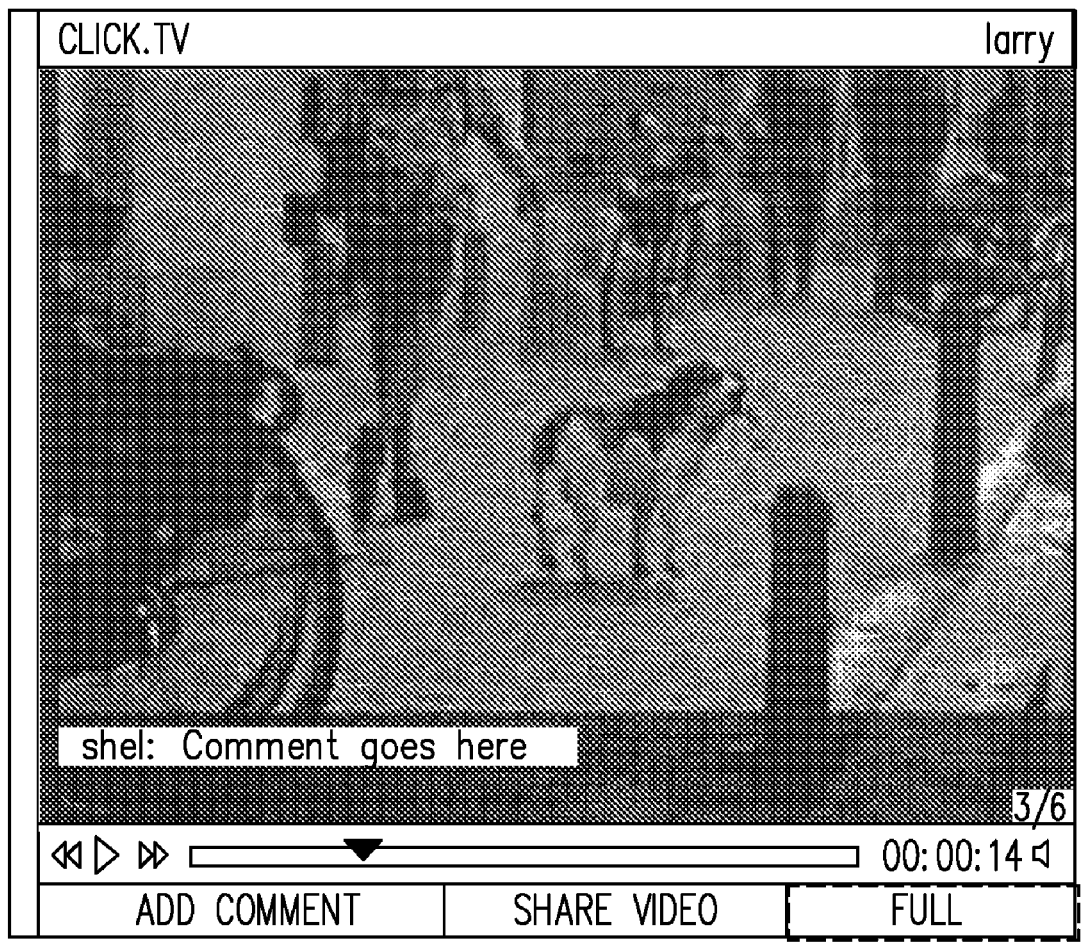
FIG. 3 illustrates one example of the user interface of FIG. 2, where a user has selected the compact mode button.

FIG. 3 illustrates an example of the user interface 200 where the user 155 has selected the "COMPACT" button. The "COMPACT" toggle button allows the user 155 to activate a more space efficient presentation of the user interface 200. When the "COMPACT" toggle button is selected by the user 155, the scrolling comments panel 250 is not displayed. In FIG. 3, the "COMPACT" toggle button has been replaced with a "FULL" toggle button. When the "FULL" toggle button is selected by the user 155, the user interface 200 returns to full mode, in which the scrolling comment panel 250 reappears. In another embodiment, this button may appear as a graphic icon in a different location, such as the upper right portion of the player.

As seen from FIG. 2, the scrolling comment panel 250 includes a set of comments 251. Each comment 251 includes a time index 253, a user ID 255, and a comment or blurb 257. The time index 253 includes a start time and an end time which determine when a comment 251 should be selected (start time) and when the comment 251 should be de-selected (end time). In another embodiment, only the start time is included in the time index. When the media presentation is in COMPACT mode, only the selected comment is displayed as an overlay on top of the bottom portion of the video. The user ID 255 includes an identification of the commenter (i.e., a user 155). This can include a real name, fictitious name, and the like. In one embodiment, the comment or blurb 257 can include any combination of text, pictures, and hyperlinks.

Figure 4:
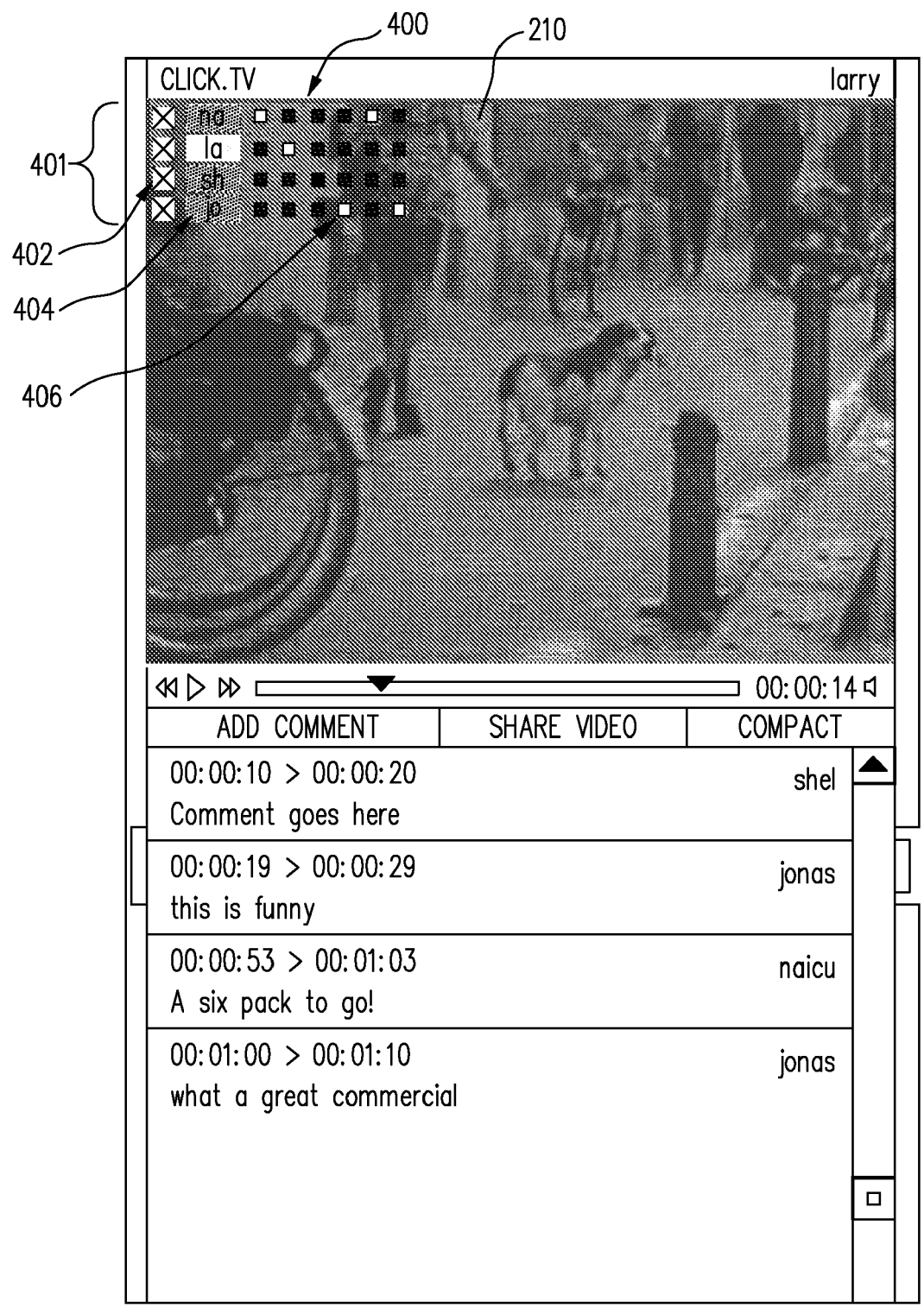
FIG. 4 illustrates one example of the user interface of FIG. 2, showing the track selection controls and display.

FIG. 4 illustrates another example of the user interface 200, showing a track selection and display 400 on the video panel 210. Display 400 includes a set of track selection buttons 401. In one embodiment, the track selection buttons 401 include a track toggle on/off 402, track names 404, and time slots 406 that can include one or more comments 251.

In one embodiment, the track selection buttons 401 are displayed in a grid-like formation as illustrated in FIG. 4, thus each horizontal row represents a collection of comments called a track. A track may represent all comments by one user, a theme-based collection of comments not tied to a user (e.g., "index"), or new groupings that the system creates from comments already in other tracks (e.g., a "search track" or a track of "NEW" comments). Each commenter has their own track as identified by their name (either just the first few letters or the complete name), and that track can be turned on and off by using the track toggle on/off 402. From left to right of the time slots 406, the boxes indicate the relative location of a comment 251 in the video 113. Boxes can be color coded, for example, red boxes can indicate the section of video 113 currently displayed in the video panel 210, and white boxes can indicate that a comment 251 is present at that time slot period.

Figure 5:
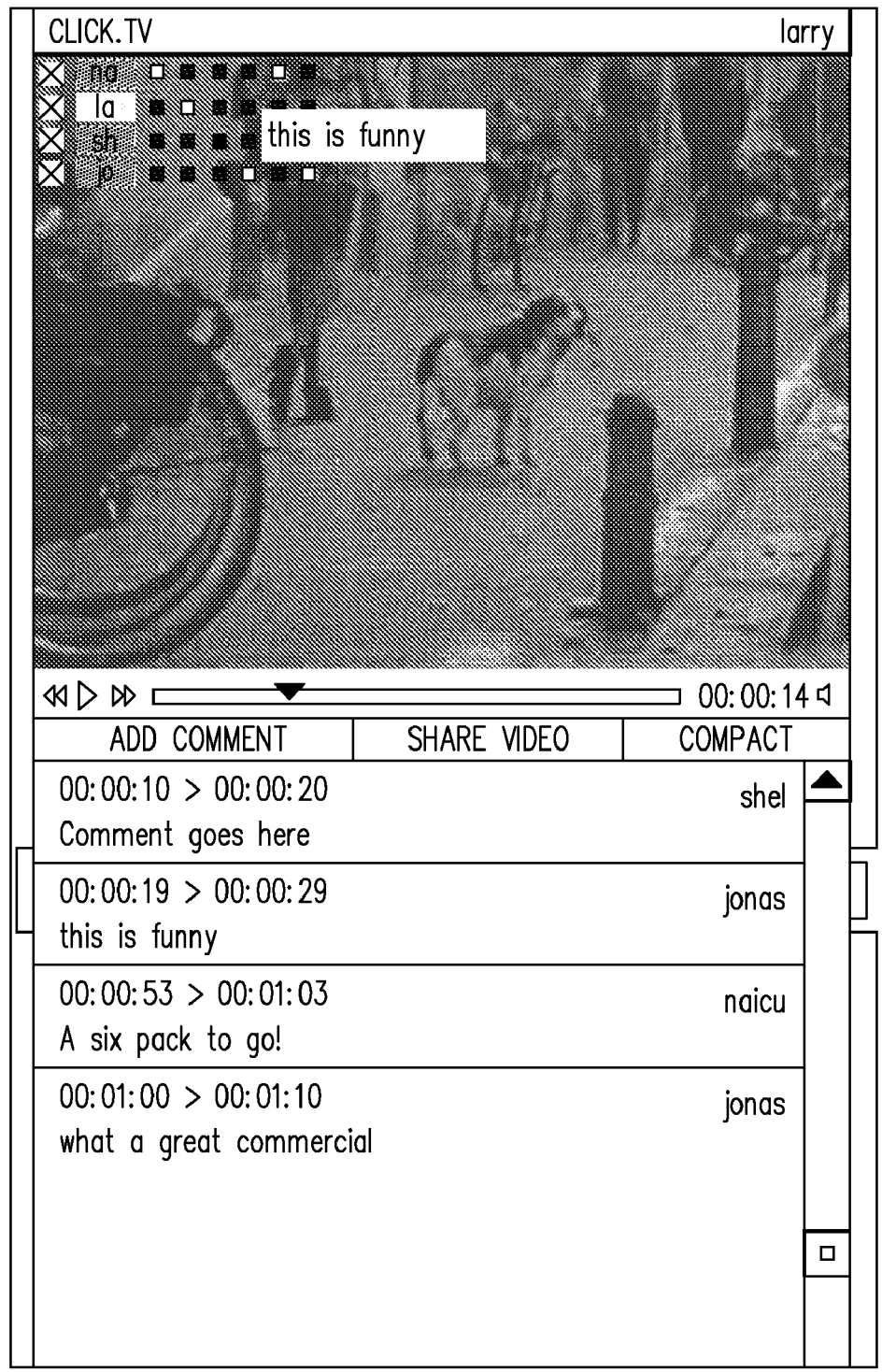
FIG. 5 illustrates one example of the user interface of FIG. 2, showing pointing at a time slot.

When the user 155 moves a mouse pointer over the video panel 210, the track selection buttons 401 are displayed. The user 155 can see additional information by pointing to any of the track selection buttons. By pointing at the time slots that contain a comment button presented as a square, a portion of the comment is displayed (see FIG. 5)—this can help the user 155 find a comment 251 they are looking for. Pointing to a time slot also enlarges the comment button. By clicking on a comment button, the comment is displayed in the scrolling comment panel 250 and the video is advanced to the start time specified for that comment 251. The selected comment is then changed to a red color, and all the time slots 406 are moved forward or backward to keep the current comment button close to the horizontal center of the video panel. In one embodiment, the user can select all the comments/tracks from one commenter by clicking on the track name on the left hand portion of the selection buttons 401. As a result, the user can play a sequential string of selected portions of the video (and see corresponding comments) associated with a single track, and skip over portions of the video that have no comments in that track associated with them.

The user 155 can manually scroll through the scrolling comment panel 250 using a typical scroll bar as known by one skilled in the art. The video 113 advances to the start time indicated in the comment 251 when the user 155 clicks on a specific comment 251.

Adding and Editing Comments

Figure 6:
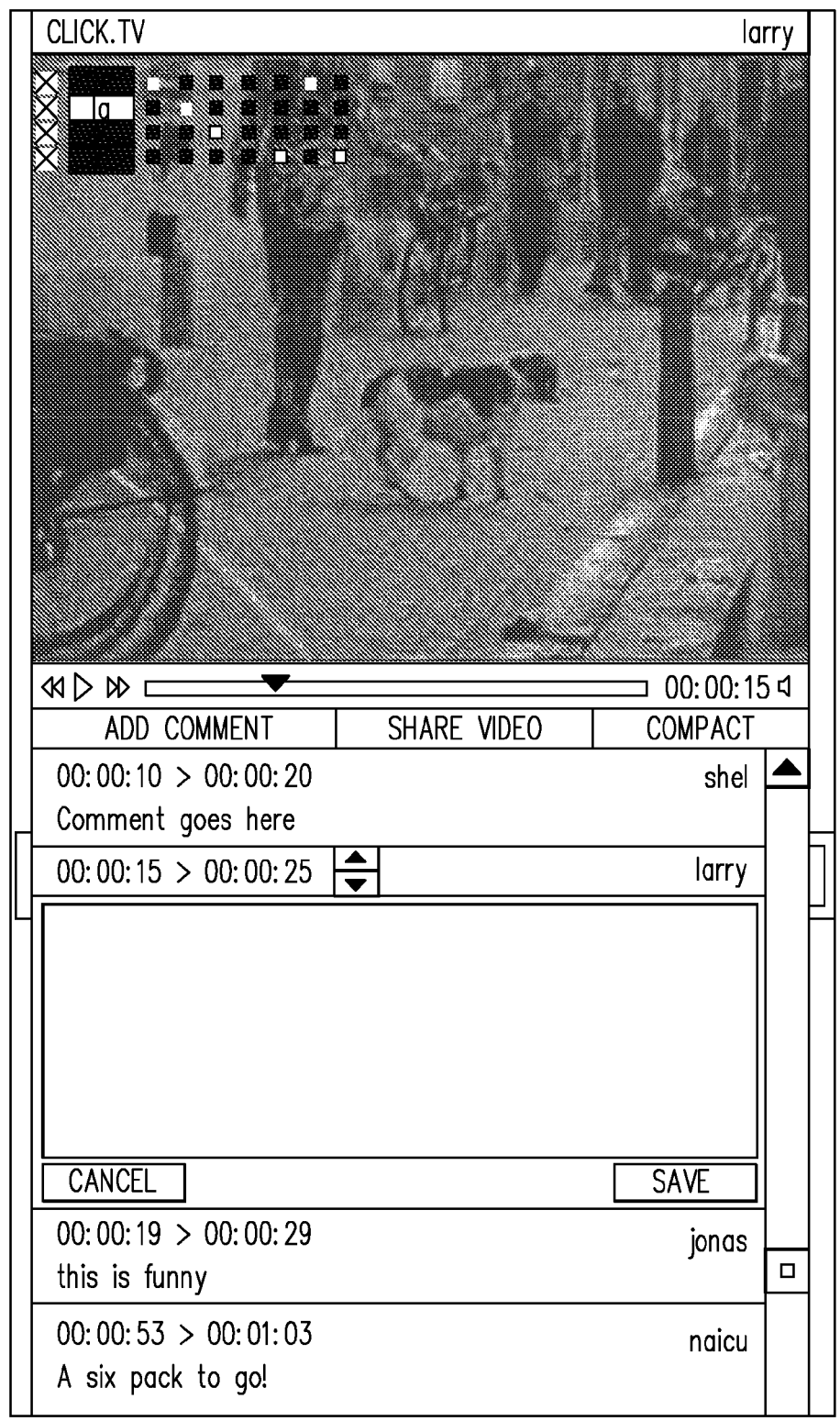
FIG. 6 illustrates one example of the user interface of FIG. 2, where a comment is added.

FIG. 6 illustrates another example of the user interface 200, in which a user can add a comment. To add a comment 251 to a portion of a video 113, the user 155 selects the "ADD COMMENT" (or something similar like "+COMMENT") button from the CLICK.TV controls 240. A comment window is displayed with an area for entering the comment or blurb 257, an area that displays the user ID 255, and an area that displays the time index 253. The start time is based on the point in time that the video 113 was at when the user 155 selected the "ADD COMMENT" button. The end time is a predefined length, such as 20 seconds, or at a selected elapsed time from the video 113. The user 155 enters the blurb 257 and can change the start time and end time of the time index 253, such as by moving start and end markers on a time scroll bar. Other ways to edit or change start and end times include selecting up/down rockers or buttons to increase/decrease the time and to pause the video at a desired start/stop time. Newly added comments and any comments that are edited are written to the CLICK.TV server 130.

Figure 7:
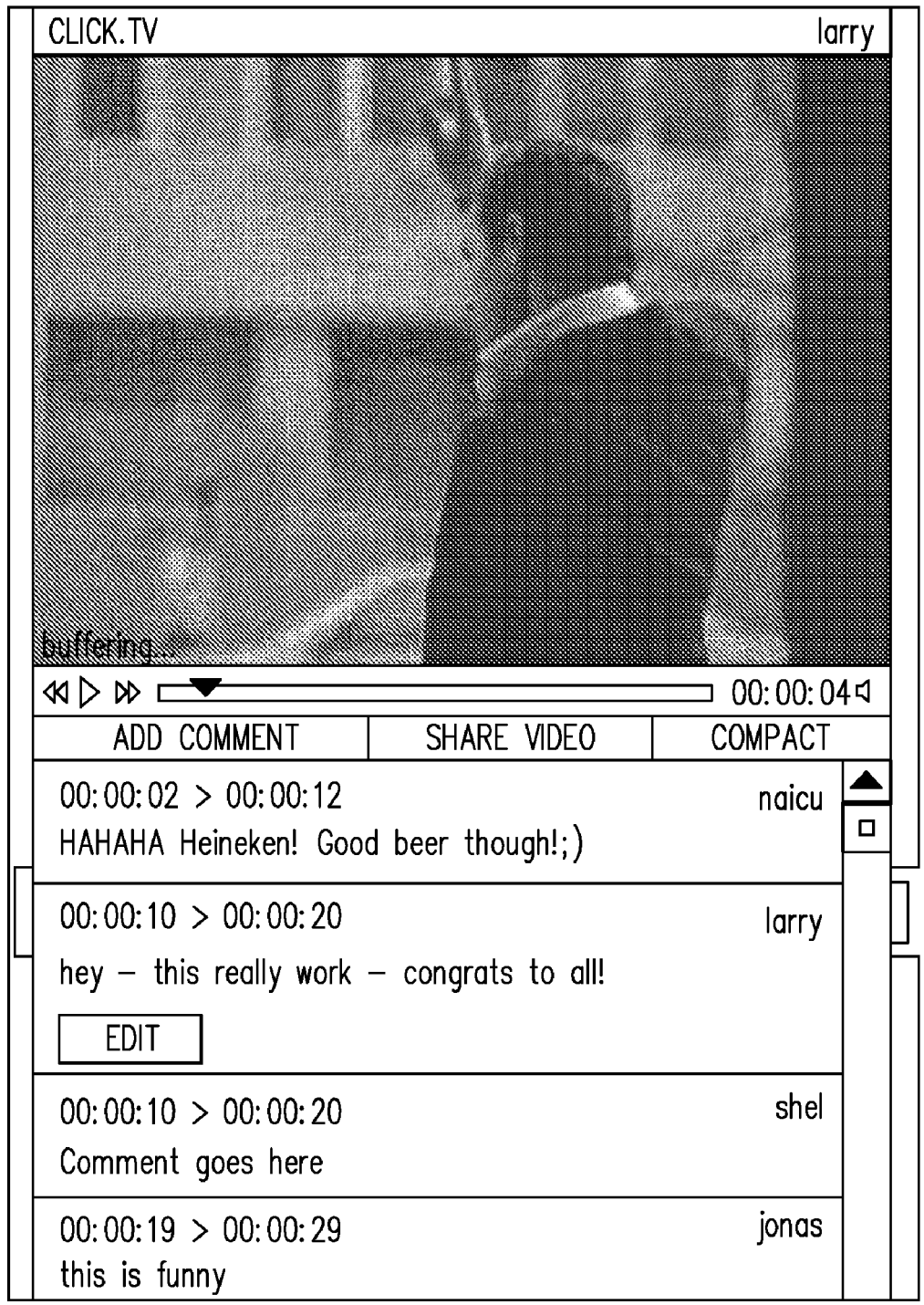
FIG. 7 illustrates one example of the user interface of FIG. 2, where a comment is edited.

FIG. 7 illustrates an example of the user interface 200 for editing a comment. To edit a comment 251 to a portion of a video 113, the user 155 selects the comment 251 they want to edit. Selecting a comment 251 can be done by any of the aforementioned methods. Comments 151 authored by the user 155 include an "edit" button when displayed in the scrolling comments panel 250. The user 155 simply clicks on the "edit" button of the comment 251 they wish to edit, and similar to entering a comment 251, the user edits the blurb 257 and the time index 253 as desired. In one embodiment, only the author of the comment can edit the comment. In other embodiments, the administrator of the web site or web page can also edit the comment, such as for inappropriate language or content.

Figure 8:
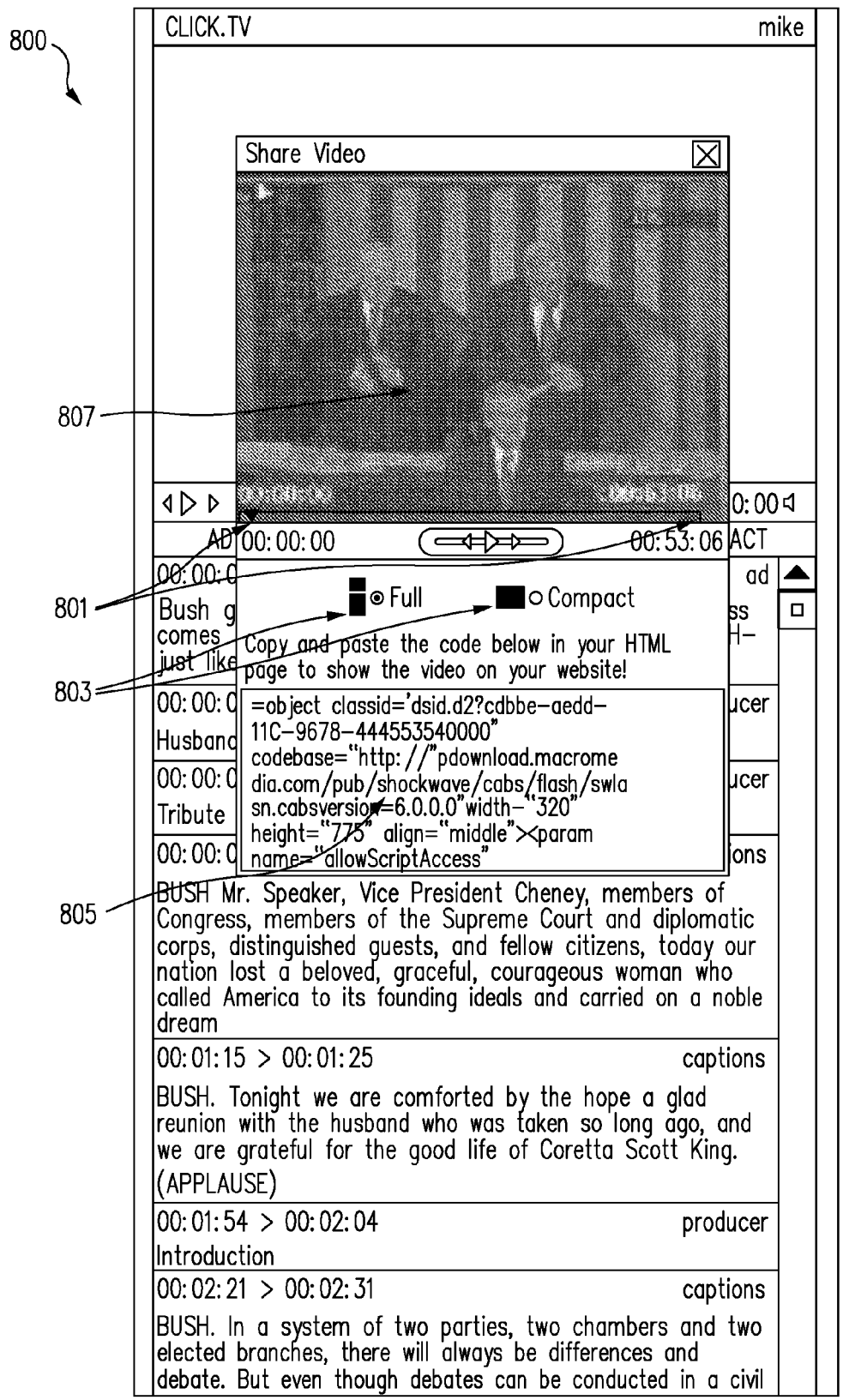
FIG. 8 illustrates one example of the user interface of FIG. 2, wherein a portion of a video is linked to a web page.

Placing a Whole or Partial Instance of a Media Presentation in Another Web Page or in an E-Mail FIG. 8 illustrates an example of the user interface 200 for linking a portion of a video to a web page. The user 155 who would like to place all or a portion of a video 113 on a web page 123 can easily do so by choosing a video 113 and then selecting the "SHARE VIDEO" button from the CLICK.TV controls 240. This button can have any suitable name, such as "BLOG". A dialog 800 is displayed within the user interface 200 that includes video selection start/stop points 801, compact/full mode preferences 803, a code window 805, and a mini video panel 807.

First, the user 155 selects the portion of video they wish to link to by dragging the start stop/points 801. When either of the start or stop arrows (as depicted in FIG. 8) are moved, the mini video panel 807 displays the frame of video at the selected point to help the user 155 with identifying the portion of the video 113 they want. When the start or stop arrows are selected, clicking on the video controls 230 (i.e. play, step backward, and step forward) moves that start or stop arrow. At any given time, either the start arrow or stop arrow is selected.

Second, the user 155 selects how another user 155 will view the video (i.e., in COMPACT mode or in FULL mode). The user does this by making a selection of the compact/full mode preference 803—the user 155 simply clicks on their preference. Third, the state of enabled and disabled tracks is preserved in the code that is generated by the SHARE VIDEO dialog box, so that when the code is placed on another site and the video is viewed, only the enabled tracks will be shown.

Once these two steps are complete, programming code is generated based on the user's selected preferences and known parameters (such as, the filename of the video 113). The programming code is displayed in the code window. As a third step, the user 155 copies the programming code and uses it on their web page 123 to link to the portion of the video 113.

In another embodiment, a "BLOG" button is selected, which opens a dialog box. If a specific track had been selected prior to clicking the "BLOG" button, the dialog box provides the user the option of sharing just the video underlying the track's comments or the entire video. The programming code displayed in the dialog box is changed corresponding to the selection. The user can then copy and paste it to their web page to link the video or desired portion thereof. If the "BLOG" button is clicked without any specific comments selected, the dialog box allows the user to select the entire video or use start and stop markers along a time scroll bar to select a specific portion of the video. As with before, once the selection is made, the corresponding programming code is displayed, which can then be copied and pasted in the user's (or any other) web page.

Thus, using this linking functionality, the user 155 can reference specific portions of the selected video 113 from a blog. For example, in a full-length video of the Academy Awards, the user 155 could provide links to the acceptance speeches of all the winners.

E-mailing portions of the selected video 113 is similar to the blog described above. However, with e-mailing, once an e-mail button is selected, a dialog box appears with typical e-mail headings, such as "To", "From", "Subject", and "Message". The link to a specific portion or portions of the video 113 is sent via e-mail, where the e-mail recipient can then click on the link to be taken to the current page of the user sending the e-mail. This enables the user to provide links to exact locations within a video to another party.

Operational Overview

Figure 9:
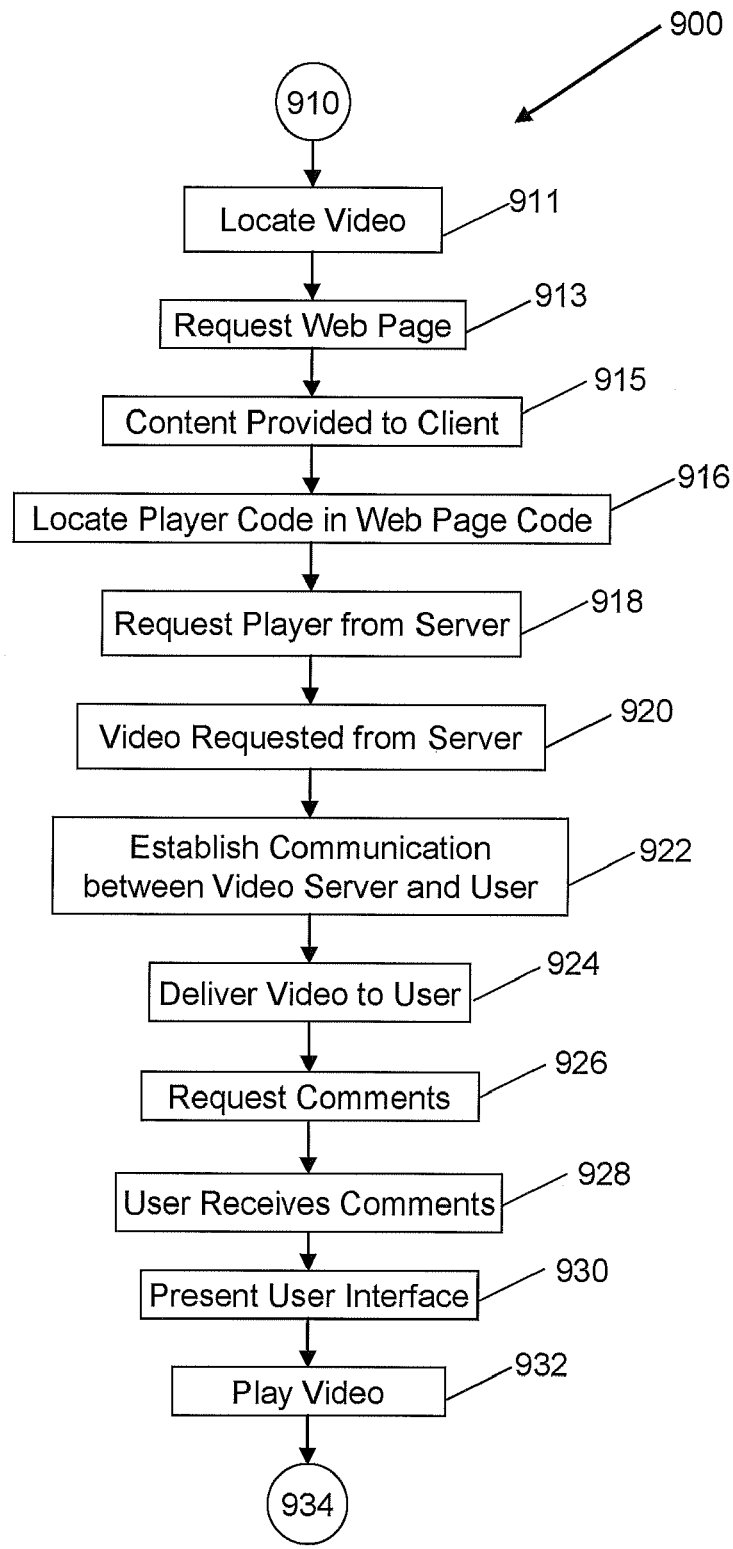
FIG. 9 shows a process flow diagram of a method for embedded metadata in a media presentation according to one embodiment.

FIG. 9 shows a process flow diagram of a method 900 for embedding metadata in a media presentation according to one embodiment. The method 900 is performed by the system 100. Although the method 900 is described serially, the steps or operations of the method 900 can be performed by separate elements in conjunction or in parallel, whether asynchronously, in a pipelined manner, or otherwise. There is no particular requirement that the method 900 be performed in the same order in which this description lists the steps, except where so indicated.

At a flow point 910, the system 100 is ready to provide specific portions of a video 113 to a user 155 upon request. At a step 911, a user 155 at a client 150 surfs the Internet looking for content of interest, such as a media presentation or video. To accomplish this, the client 150 uses software known for browsing the Internet (such as, Internet Explorer, Netscape Navigator, Mozilla Firefox). The surrounding web page, in some embodiments, is not needed, as described above. Once found, the client 150 requests the desired web pages 123 from the web server 120 at a step 913. In response, the web server 120 provides the content to the client 150 at a step 915.

At a step 916, the browser for the client 150 locates the CLICK.TV code within the code of the desired web page and finds a reference to the CLICK.TV player. For example, the code on the web page used by the CLICK.TV system, i.e., the "CLICK.TV code," may look something like <object type="application/x-shockwave-flash" data=http://www.click.tv/ctss.swf . . . </object>. The first part of the data variable refers to the CLICK.TV player, which is in the SWF format. SWF (or Small Web Format) is a proprietary multimedia application file format produced using Flash software from Adobe (formerly Macromedia), which is optimized for dynamic Internet distribution. SWF files can contain animations or applets of varying degrees of interactivity and function. The CLICK.TV code, identifying the CLICK.TV player, can be inserted into the web page code at different times and through different means. For example, the code can be inserted manually (by the person typing the HTML page code) or automatically generated and inserted, such as through a software program running on any web site. The client 150, through the programming code (e.g., by a object tag request), then requests the CLICK.TV player or the media application 133 from the CLICK.TV server 130 at step 918. In response, the media application 133 is downloaded to the client 150 from the CLICK.TV server 130 and is activated.

At a step 920, the media application 133 requests the video 113 from the video server 110. In one embodiment, the CLICK.TV player or the media application 133 locates the "rtmpurl" parameter within the web page code and uses it to request a video stream from a streaming video server 110. For example, the "rtmpurl" code may look something like "rtmpurl=rtmp://www.click.tv/movies/Italy_France . . . " For a downloaded video, the media application 133 looks for the "httpurl" parameter rather than the "rtmpurl" parameter. At a step 922, the video server 110 establishes a connection with the client 150 through the communication network 140. The video 113 is then delivered by the video server 110 to the client 150 at a step 924 either via streaming or download.

At a step 926, the media application 133 requests all the comments 251 associated with the video 113 from the CLICK.TV server 130. In one embodiment, the media application 133 locates the "mid" parameter in the CLICK.TV code and uses it to request comment data from the CLICK.TV server 130. For example, the "mid" (Movie ID) parameter may look something like "mid=06949f00870420c50501e82e01f1c9df". At a step 928, all or a subset of comments 251 associated with the video 113 for that Movie ID are received by the client 150. The media application 133 or CLICK.TV player is now initialized.

At a step 930, the user interface 200 is presented to the user 155, and at a step 932, playback of the video 113 begins. At a flow point 934, the system 100 has provided at least one specific portion of a video 113 to a user 155 upon request. After initialization, the CLICK.TV player or the media application 133 continues to communicate with the video server 110 and the CLICK.TV server 130. If it is using streaming, it streams video from video server 110 when the video is playing or when the playhead is moved. It sends comment data to the CLICK.TV server 130 when the user 155 saves a new or edited comment.

The video file can be stored anywhere on the Internet, such as a video streaming server (e.g., the video server 110) or a conventional HTTP server. Thus, the video file is stored separately from the CLICK.TV player and comment data (which are stored in the CLICK.TV server 130), so that the user simply needs to insert the proper URL for the video into an instance of CLICK.TV code. The selected video can then be used, as described above, by referencing the video and associated comments. Thus, integration of the nonlinear user interface, as described herein, can be a simple process.

Search a Video Based on Embedded Metadata (Comments)

In one embodiment, a search engine can search videos based on the comments 251 entered by users 155. This would allow the searching user 155 to locate specific portions of a video that they would like to view. For example, in a video of the 2006 Oscars, the user 155 might want to quickly view the acceptance speech of the Best Male Actor without watching the entire three hour presentation. Comments would be placed in the video of the Oscars at the appropriate points that would say something similar to "Best Male Actor". A search using a web search engine (such as, Excite, Yahoo, Google, etc.) would locate the part of the video that has comments with that search term. This works as follows: The user clicks on the link on the search results page to see the page that has the video. When this page is requested by the browser, the CLICK.TV code invokes a function that retrieves the user's original search term from the referrer URL. It then instructs the CLICK.TV player to run this search, create a search track for the term, and play the video underlying comments with that search term.

Advertising

Figure 10:
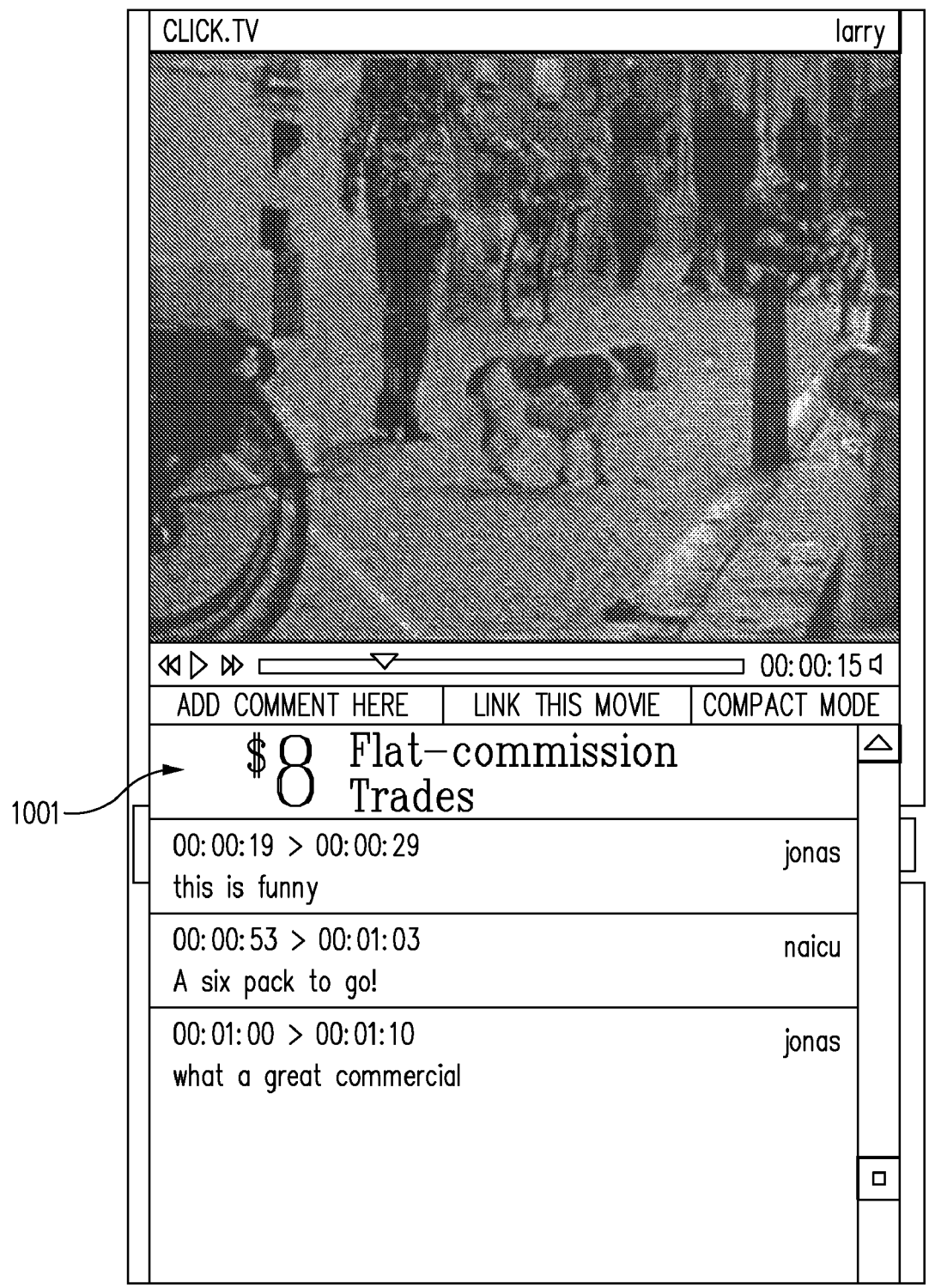
FIG. 10 illustrates one example of the user interface of FIG. 2, where a sticky comment is added.

FIG. 10 illustrates an example of the user interface 200 which includes a sticky comment 1001. The sticky comment 1001 is similar to a comment 251 in that it appears in the scrolling comment panel 250 and can include text, graphics, and links to web addresses. In one embodiment, the sticky comment 1001 appears as comments scroll in the scrolling comment panel 250. When the sticky comment 1001 scrolls to the top of the scrolling comment panel 250, it can remain there for a predetermined amount of time. Generally, sticky comments 1001 are used for advertisements, but they may also be used as video markers, such as chapter dividers and the like.

Inserting a Hyperlink into a Comment

A hyperlink can also be inserted into a comment, which takes the user to a separate web page, web site, or other media presentation, such as a document. For example, a stationary or scrolling comment can include a link, which when clicked on by the user, opens a separate screen to a specific web page, web site, or document. Thus, the link, as part of the comment, is attached to a point inside a media presentation, and is visible to the user when the particular comment is visible.

Live Comments

In an embodiment of the invention, comments 251 can be inserted into a live video feed from multiple users 155. This embodiment works well for sporting events, news events, ceremonies, and the like. Comments 251 can be recorded along with the video feed, and as such, can provide searchable text to events within the video. The CLICK.TV players of all users currently viewing this video are automatically refreshed with all or a subset of comments on a periodic basis (e.g. every 30 seconds).

Telestrator

In another embodiment of the invention, users 155 can freeze playback of a video and add graphic elements. For example, in a news video, a news editor may wish to add an arrow pointing to a piece of debris about to get sucked into a jet engine. Audio comments, could also be added (and text comments 251), for example "See the tire debris, it is about to get sucked into the engine causing the engine to explode!?" The graphic elements would be controlled similar to the text comments 251 and audio comments, with tracks, a time index 253, etc.

Audio Comments

In one embodiment of the invention, comments 251 can be inserted in the form of audio. Audio comments are handled by the system 100 similar to the text comments 251, in that, they are administered by using the track selection buttons 401. Tracks can be turned off and on in the same way, etc. When an audio comment plays, the primary audio of the video can be reduced in volume so the audio comment is more easily heard. Audio comments have an associated time index 253 for determining when they play and can be associated with a text comment 251, which can be useful for the hearing impaired. Essentially, audio comments are handled in much the same way as text comments 251.

Some minor differences in handling include a title that the user 155 adds to be associated with the audio such that when its box in the grid is pointed to by a mouse, the title is displayed to the user 155. In one embodiment, the box for an audio comment would appear differently than that of any other type of comment 251. It may be a different color or have a different shape or icon.

Interactive Comments

An interactive comment includes a comment that allows a user 155 to provide feedback on a video file during its presentation. In one embodiment, a comment panel presented to a user 155 can contain a popup menu, text input field, radio button set, submit button, allowing the user to interact with the presentation, such as respond to a question or make a vote.

CONCLUSION

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

The invention claimed is:

1. A method comprising:
providing a media application to a user, wherein the media application includes code associated with an Internet web page;
delivering a media presentation to the user based on a first parameter of the code, the first parameter being used to request a video data flow associated with the media presentation from a server;
delivering comments associated with the media presentation to the user based on a second parameter of the code, the second parameter including information related to a location of the comments associated with specific portions of the video data; and
accessing the media presentation, wherein media application enables editing, management, or non-linear viewing options for the user.

2. The method of claim 1, further comprising updating the media application with additional comments from the user.

3. The method of claim 1, wherein the second parameter is associated with a subset of specific comments.

4. The method of claim 1, wherein the editing options comprise inserting comments or other metadata into a specific portion or time of the media presentation, selecting metadata associated with a specific portion or time of the media presentation, and linking together a plurality of non-continuous selected portions of the media presentation.

5. The method of claim 1, wherein the media presentation comprises streaming video.

6. The method of claim 5, wherein the placing comprises inserting a block of code to the web page.

7. The method of claim 1, wherein the non-linear viewing options comprise viewing portions of the media presentation indicated by results from a search of comments in the media presentation, viewing portions of the media presentation indicated by results from a search for a specific user who has comments in the media presentation, viewing portions of the media presentation indicated by comments and other metadata at specific times in the media presentation from a plurality of users, and viewing portions of the media presentation indicated by selected comments from one or more users.

8. The method of claim 7, wherein the media presentation is moved to a specific portion for the viewing.

9. The method of claim 1, wherein the management options comprise transmitting at least a selected portion of the media presentation to an e-mail recipient and placing at least a selected portion of the media presentation on a web page.

10. The method of claim 1, wherein the media application provides a user interface for the user, wherein the interface comprises a video display and a scrolling comment panel.

11. The method of claim 10, wherein the interface further comprises a viewing control panel and an editing/management control panel.

12. The method of claim 11, wherein the editing/management control panel comprises a search window.

13. The method of claim 10, wherein users who have provided comments are displayable on the video display.

14. The method of claim 13, wherein the users who have provided comments are displayed by moving a pointer onto a portion of the video display.

15. The method of claim 13, wherein one or more comment indicators are displayable adjacent corresponding users who made comments.

16. The method of claim 10, further comprising placing a stationary advertisement on a portion of the scrolling comment panel.

17. The method of claim 1, wherein the media presentation is stored on a server different from where the media application is stored.

18. The method of claim 1, wherein if the code contains a downloading parameter, the media presentation is downloaded, and if the code contains a streaming parameter, the media presentation is streamed.

19. The method of claim 1, wherein code associated with the media application is embedded manually or automatically through a software program.

20. The method of claim 1, wherein the media application enables the user to provide a link in a comment to a separate web page.

21. A system comprising:
a server in communication with a user;
a video server serving a media presentation in communication with a user; and
a user interface configured to allow the user to insert comments at specific points in time into the media presentation and search for portions of the media presentation indicated by comments, wherein the media presentation is delivered based on a first parameter of web page code, the first parameter being used to request a video data flow associated with the media presentation, and wherein delivering the comments associated with the media presentation is based on a second parameter of the code, the second parameter including information related to a location of the comments associated with specific portions of the video data.

22. The system of claim 21, wherein the user interface is further configured to allow the user to view the media presentation at a desired place in the media presentation based on a result of the search.

23. The system of claim 21, wherein the user interface comprises a video panel and a scrolling comment panel.

24. The system of claim 23, wherein the user interface further comprises a viewing control panel and an editing/management control panel.

25. The system of claim 24, wherein the editing/management control panel comprises a search window.

26. The system of claim 21, wherein the user interface comprises an editing/management control panel configured to enable the user to select specific start or stop points in the media presentation.

27. A method comprising:
delivering a media presentation from the Internet based on a first parameter of a code on a web page, wherein a portion of the code is associated with a media application, the first parameter being used to request a video data flow associated with the media presentation;
delivering comments associated with specific start or end times of the media presentation based on a second parameter of the code, wherein the second parameter includes information related to a location of the comments associated with specific portions of the video data; and
updating the media presentation with new comments.

28. The method of claim 27, wherein the comments are provided in conjunction with viewing of the media presentation, which comprises streaming video.

29. The method of claim 28, further comprising presenting at least a portion of the media presentation associated with a specific start time to a user.

30. A method comprising:
identifying a media presentation from the Internet;
linking comment information to any portion of the media presentation; and
presenting initially the specific portion of the media presentation in association with the information to a user, wherein the media presentation is delivered based on a first parameter of web page code, the first parameter being used to request a video data flow associated with the media presentation, and wherein delivering the comments associated with the media presentation is based on a second parameter of the code, the second parameter including information related to a location of the comments associated with specific portions of the video data.

31. The method of claim 30, wherein the specific portion is from a search, from a specific user, or based on a theme.

32. The method of claim 30, further comprising:
presenting an identifier associated with at least one portion of the media presentation having information linked thereto; and
responding to a selection of the identifier by starting presentation of the media presentation at a beginning of the portion thereof, and substantially concurrently presenting the information linked thereto.

33. The method of claim 30, wherein the media presentation comprises streaming video.

34. The method of claim 30, further comprising identifying a user associated with the information linked to the portion of the media presentation.

35. The method of claim 30, further comprising responding to requests for dynamically adding additional information to the linked information.

36. The method of claim 30, further comprising:
presenting the information in a format that includes identifiers for links to particular portions of the media presentation; and
presenting the particular portions of the media presentation substantially concurrently when the identifiers for those links come into view.

* * * * *